US009075542B2

(12) United States Patent
Maki et al.

(10) Patent No.: US 9,075,542 B2
(45) Date of Patent: Jul. 7, 2015

(54) STORAGE SYSTEM

(71) Applicant: HITACHI, LTD., Tokyo (JP)

(72) Inventors: Nobuhiro Maki, Yokohama (JP);
Masamitsu Takahashi, Chigasaki (JP);
Nobuyuki Osaki, Yokohama (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/162,588

(22) Filed: Jan. 23, 2014

(65) Prior Publication Data

US 2014/0136781 A1  May 15, 2014

Related U.S. Application Data

(63) Continuation of application No. 12/013,562, filed on Jan. 14, 2008, now Pat. No. 8,661,212.

(30) Foreign Application Priority Data

Jan. 29, 2007 (JP) ................................. 2007-018191

(51) Int. Cl.
*G06F 3/06* (2006.01)
*G06F 12/14* (2006.01)
*G06F 11/14* (2006.01)

(52) U.S. Cl.
CPC .......... *G06F 3/0665* (2013.01); *G06F 12/1458* (2013.01); *G06F 11/1456* (2013.01); *G06F 3/0607* (2013.01); *G06F 3/0632* (2013.01); *G06F 3/067* (2013.01); *G06F 3/0619* (2013.01); *G06F 3/0689* (2013.01)

(58) Field of Classification Search
CPC .................................................. G06F 11/1456
See application file for complete search history.

(56) References Cited

U.S. PATENT DOCUMENTS

| 6,775,673 B2 | 8/2004 | Mahalingam et al. |
| 7,065,610 B1 | 6/2006 | Black |
| 2002/0129202 A1 | 9/2002 | Yamamoto et al. |
| 2004/0243776 A1 | 12/2004 | Matsui et al. |
| 2005/0172040 A1 | 8/2005 | Hashimoto |
| 2005/0283583 A1 | 12/2005 | Asano et al. |

FOREIGN PATENT DOCUMENTS

| JP | 11-85408 A | 3/1999 |
| JP | 2003114768 A2 | 4/2003 |
| JP | 2005-222123 A | 8/2005 |

*Primary Examiner* — Baboucarr Faal
(74) *Attorney, Agent, or Firm* — Sughrue Mion, PLLC

(57) ABSTRACT

A storage system 300a that has a volume, manages the volume as a plurality of logical volumes, and can operate as a plurality of logical storage systems having at least one logical volume. The storage system comprises an IO transmission-reception unit 1320a that communicates with a management computer 100, a host computer 200, and a storage system 300b and a processor 1310a that causes the IO transmission-reception unit 1320a to perform transmission to the management computer 100 and storage system 300b by using an identifier of the storage system 300a as an identifier indicating a representative logical storage system that is one predetermined logical storage system from among a plurality of the logical storage system when the storage system operates as a plurality of the logical storage systems.

5 Claims, 16 Drawing Sheets

FIG. 3A
FIG. 3B
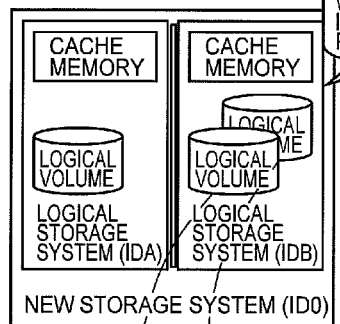
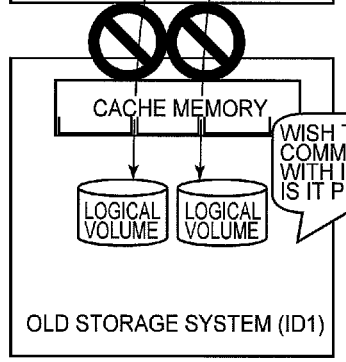
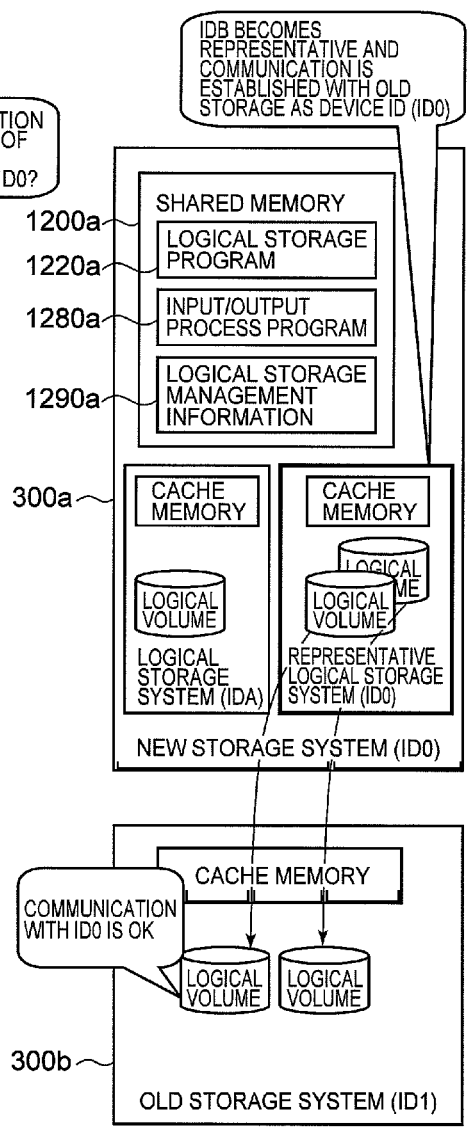

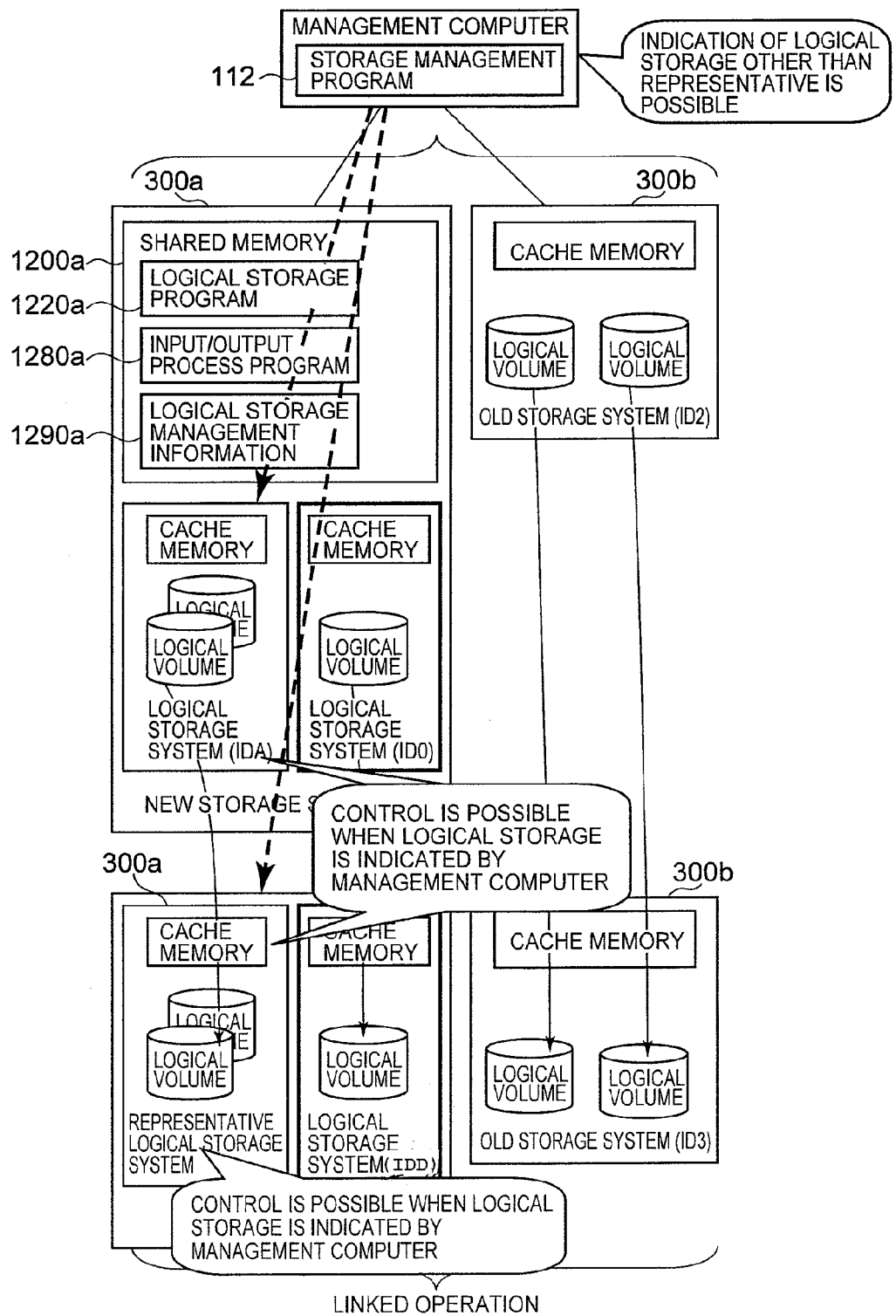

LOGICAL STORAGE CONTROL INFORMATION

LOGICAL STORAGE VOLUME MANAGEMENT INFORMATION

LOGICAL STORAGE COPY PAIR MANAGEMENT INFORMATION

COPY PAIR MANAGEMENT INFORMATION

1210(1210a,1210b)

VOLUME MANAGEMENT INFORMATION

1250(1250a,1250b)

IO REQUEST

7300

| EMULATION LEVEL | SUPPORT FUNCTION | | |
|---|---|---|---|
| | LOCAL COPYING | REMOTE COPYING | STORAGE LOGICAL PARTITIONING |
| α | SUPPORTED | UNSUPPORTED | UNSUPPORTED |
| β | SUPPORTED | SUPPORTED | UNSUPPORTED |
| γ | SUPPORTED | SUPPORTED | SUPPORTED |

COPY INFORMATION TABLE

STORAGE SYSTEM INFORMATION TABLE

STORAGE SYSTEM

CROSS-REFERENCE TO PRIOR APPLICATION

This application is a Continuation of U.S. application Ser. No. 12/013,562 filed Jan. 14, 2008, which relates to and claims the benefit of priority from Japanese Patent Application number 2007-18191, filed on Jan. 29, 2007 the entire disclosure of which is incorporated herein by reference.

BACKGROUND

The volume of data in a computer system having storage systems has increased explosively, and a large number of storage systems for holding the data are now installed in the computer system. In such a computer system, it is sometimes necessary to implement one processing for a plurality of linked storage systems. Remote copying technology for avoiding data loss or interruption of business service, for example due to accidents or device failure, is used as a processing technology performed for such a link of a plurality of storage systems. The remote copying technology is disclosed, for example, in Japanese Patent Application Laid-open No. 11-85408.

With the remote copying technology, a first storage system stores data received from a host computer. The first storage system then transmits the data received from the host computer to the second storage system disposed in a physically remote location. As a result, the second storage system stores the data received from the first storage system. In a computer system employing the remote copying technology, data and processing thereof can be restored within a comparatively short period even if an accident or failure occurs. More specifically, in the computer system employing the remote copying technology, restoration from a failure can be performed by using data stored in the second storage system.

On the other hand, a logical partitioning technology for storage systems is used by which one storage system is logically partitioned in order to provide an adequate storage resource of input/output performance (IO performance) to a large number of host computers disposed in a computer system. The logical partitioning technology for storage systems is disclosed, for example, in Japanese Patent Application Laid-open No. 2005-222123. With the logical partitioning technology for storage systems, a plurality of logical storage systems comprising storage resources and cache memories different from those of the storage system itself can appear to the host computer and storage system of the link destination to be present in the storage system. As a result, it is possible to allocate storage resources and provide IO performance suitable for a plurality of present host computers.

When the logical partitioning technology for storage systems is applied to computer systems operated with a plurality of storage systems linked together, e.g., in a remote copying mode, the following problem is encountered. Thus, when a storage system that comprises a logical partitioning function (refereed to as "high-functionality storage system") is to be linked to a storage system that does not comprise a logical partitioning function (referred to as "low-functionality storage system"), the low-functionality storage system cannot recognize the presence of logical storage systems that were logically partitioned in the high-functionality storage system, and the low-functionality storage system and high-functionality storage system cannot be linked correctly.

Likewise, the presence of logical storage systems sometimes cannot be recognized not only in the low-functionality storage system serving as an example of an external device, but also in other external devices such as management computers that are not associated with the logical partitioning function, and the processing cannot be executed adequately.

SUMMARY

Accordingly, with the foregoing in view, it is an object of the present invention to provide a technology that makes it possible even for external devices that are not associated with the logical partitioning function to recognize adequately the logical storage systems.

In order to attain this object, a storage system in accordance with one aspect of the present invention is a storage system that has a volume, manages the volume as a plurality of logical volumes, and can operate as a plurality of logical storage systems having at least one logical volume, the storage system comprising a communication unit for communication with an external device, and a communication control unit that causes the communication unit to perform communication with the external device by using an identifier of the storage system as an identifier indicating a representative logical storage system that is one predetermined logical storage system from among a plurality of the logical storage system when the storage system operates as a plurality of the logical storage systems.

BRIEF DESCRIPTION OF THE DRAWINGS

FIG. 3A is an operation diagram that assumes that a storage system comprising a storage logical partitioning function and a storage system that does not comprise a storage logical partitioning function are linked;

FIG. 3B is an operation diagram relating to the case where a storage system comprising a storage logical partitioning function and a storage system that does not comprise a storage logical partitioning function are linked, this operation diagram relating to the embodiment of the present invention;

FIG. 5B illustrates the concept of operation in the case where a storage system that does not comprise the storage logical partitioning function is added to a computer system operating a plurality of storage systems comprising the storage logical partitioning function, this operation relating to an embodiment of the present invention;

DESCRIPTION OF THE PREFERRED EMBODIMENTS

The embodiments of the present invention will be described below with reference to the appended drawings. The embodiments explained hereinbelow place no limitation of the invention described in the claims, and the combinations of all the features explained in the embodiments are not necessarily required to attain the object of the present invention.

Figure 1:
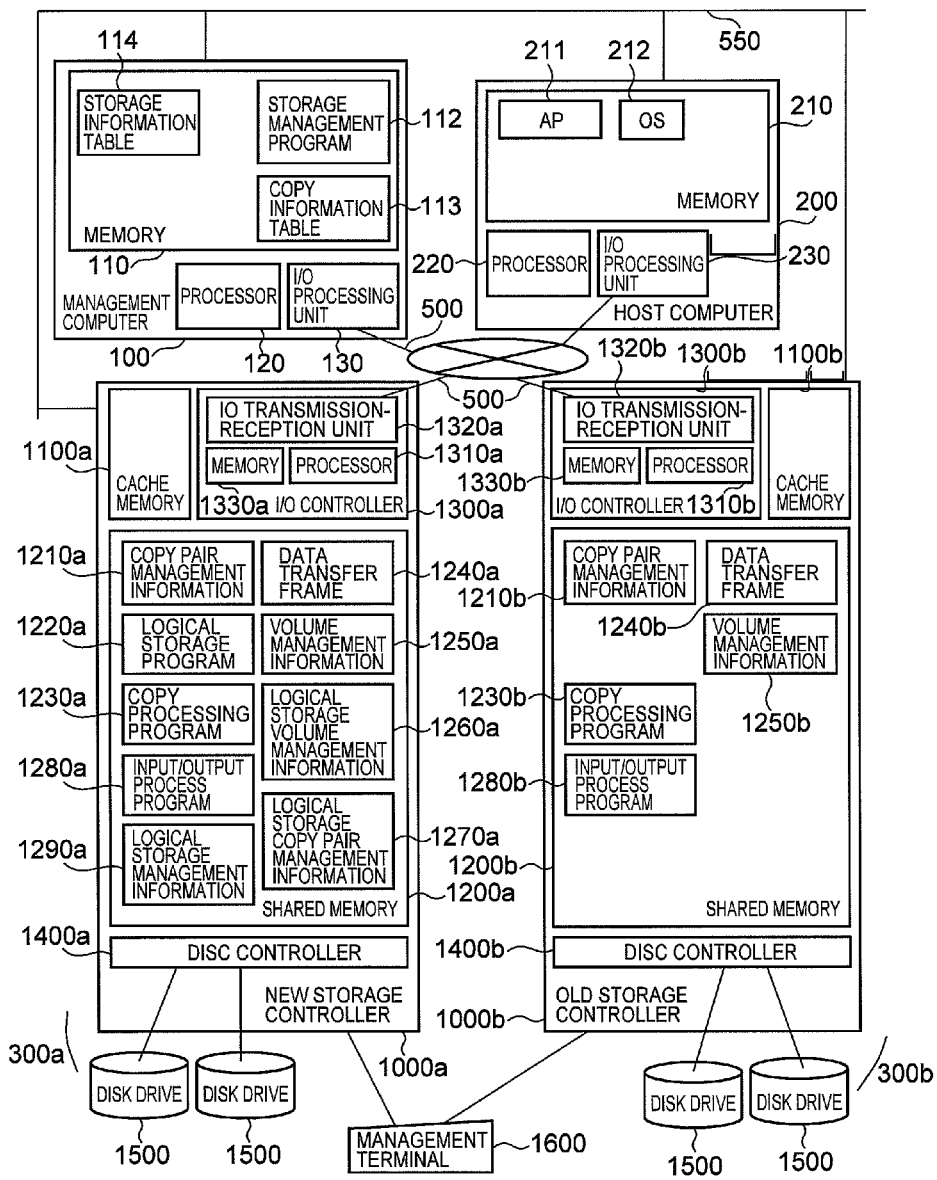
FIG. 1 is a block diagram relating to the configuration of a computer system of an embodiment of the present invention.

FIG. 1 is a block diagram relating to the configuration of a computer system of an embodiment of the present invention.

The computer system comprises a management computer 100, a host computer 200, a new storage system 300a as an example of a storage system, an old storage system 300b, and a management terminal 1600. Here, the new storage system 300a is a high-functionality storage system comprising a logical partitioning function. The old storage system 300b is a low-functionality storage system that does not have a logical partitioning function. FIG. 1 shows only one management computer 100 and one host computer 200, but this configuration is not limiting and each of them may be provided as a single computer or as a plurality of computers. Further, the figure shows only one new storage system 300a and one old storage system 300b, but this configuration is not limiting and each of them may be provided as a single storage system or as a plurality of storage systems.

The management computer 100, host computer 200, and storage system 300 (this term is used to describe the new storage system 300a and old storage system 300b together), and management terminal 1600 are connected to each other via a data communication link 500. Further, the management computer 100 is connected to the host computer 200, storage system 300, and management terminal 1600 via a device control link 550.

The management computer 100 comprises a memory 110, a processor 120, and an I/O processing unit 130. The memory 110, processor 120, and I/O processing unit 130 are connected to each other by an internal network (not shown in the figure). The processor 120 performs a variety of processing operations by executing programs stored in the memory 110. For example, the processor 120 controls the remote copying executed by the storage system 300 by transmitting an IO request to the storage system 300 with the I/O processing unit 130. Further, the IO request includes a write request, a read request, a remote copying control request, and a storage system reference indication. The IO request will be described below in greater detail with reference to FIG. 11.

The memory 110 stores programs to be executed by the processor 120 and information that can be necessary for the processor 120. More specifically, the memory 110 stores a storage management program 112, a copy information table 113, and a storage information table 114. Further, the memory 110 may also store an OS (Operation System) and application program (AP).

Executing the storage management program 112 with the processor 120 realizes the processing of managing the storage system 300 connected via the device control link 550. The copy information table 113 contains information for managing the configuration and status of remote copying. The number of copy information tables 113 stored in the memory 110 is equal to the number of synchronous copying operations (an example of remote copying) managed by the management computer 100. The copy information table 113 will be descried below in greater detail with reference to FIG. 16. The storage information table 114 contains information relating to the storage system 300 that is managed by the management computer 100. The storage information table 114 will be described below in greater detail with reference to FIG. 17. The I/O processing unit 130 is an interface for connecting the management computer 100 to the host computer 200 and storage system 300 via the data communication link 500.

The host computer 200 comprises a memory 210, a processor 220, and an I/O processing unit 230. The memory 210, processor 220, and I/O processing unit 230 are connected to each other via an internal network (not shown in the figure). The processor 220 performs a variety of processing operations by executing programs stored in the memory 210. For example, the processor 220 accesses a logical volume provided by the storage system 300 by transmitting an IO request to the storage system 300 with the I/O processing unit 230.

The memory 210 stores programs to be executed by the processor 220 and information that can be necessary for the processor 220. More specifically, the memory 210 stores an application program (AP) 211 and an OS 212. The AP 211 is executed by the processor 220 and implements a variety of processing operations with the processor 220. For example, the AP 211 provides a data base function or WEB server function with the processor 220. The OS 212 implements the overall control of processing in the host computer 200 with the processor 220.

The I/O processing unit 230 is an interface for connecting the host computer 200 to the management computer 100 and storage system 300 via the data communication link 500. More specifically, the I/O processing unit 230 transmits an IO request to the storage system 300.

The new storage system 300a comprises a storage controller 1000a and a plurality of disk drives 1500. The disk drives 1500 stores data that were requested to be written from the host computer 200.

The storage controller 1000a controls the entire storage system 300a. More specifically, the storage controller 1000a controls writing of data into the disk drives 1500 and reading of data from the disk drives 1500. Furthermore, the storage controller 1000a provides a volume of the disk drives 1500 as at least one logical volume to the host computer 200. Furthermore, the storage controller 1000a provides a logical partitioning function that provides a logical volume as a logical volume of one of logical storage systems to the host computer 200 and management computer 100.

The storage controller 1000a comprises a cache memory 1100a, a shared memory 1200a, an I/O controller 1300a, and a disk controller 1400a. The cache memory 1100a, shared memory 1200a, I/O controller 1300a, and disk controller 1400a are connected to each other by an internal network (not shown in the figure).

The cache memory 1100a temporarily stores data that are to be written into disk drives 1500 and data that are to be read from disk drives 1500. The disk controller 1400a controls writing of data into disk drives 1500 and reading of data from disk drives 1500.

The I/O controller 1300a comprises a processor 1310a, an IO transmission-reception unit 1320a, and a memory 1330a. The processor 1310a, IO transmission-reception unit 1320a, and memory 1330a are connected to each other by an internal network (not shown in the figure).

The IO transmission-reception unit 1320a is an interface for connection to the management computer 100, host computer 200, and other storage systems 300 via the data communication link 500. More specifically, the TO transmission-reception unit 1320a receives an IO request from the management computer 100 or host computer 200. Furthermore, the IO transmission-reception unit 1320a transmits the data read from disk drives 1500 to the management computer 100 or host computer 200. In addition, the IO transmission-reception unit 1320a transmits and receives data exchanged between the storage systems 300.

The processor 1310a performs a variety of processing operations by executing programs stored in the memory 1330a or shared memory 1200a. More specifically, the processor 1310a recognizes the IO request received by the IO transmission-reception unit 1320a, writes data to the cache memory 1100a, and implements copy processing (remote copying processing) to the other storage system 300.

The memory 1330a stores programs that will be executed by the processor 1310a and information that can be necessary for the processor 1310a.

The shared memory 1200a stores programs that will be executed by the processor 1310a and information that can be necessary for the processor 1310a. In addition the shared memory 1200a stores programs that will be executed by the disk controller 1400a and information that can be necessary for disk controller 1400a. More specifically, the shared memory 1200a stores copy pair management information 1210a, a logical storage program 1220a, a copy processing program 1230a, a data transfer frame 1240a, volume management information 1250a, logical storage volume management information 1260a, logical storage copy pair management information 1270a, an input/output process program 1280a, and logical storage management information 1290a.

The logical storage program 1220a is executed by the processor 1310a and implements the processing of converting a storage ID and logical volume ID into logical ID that are different from those set by the storage system 300a. The copy processing program 1230a is executed by the processor 1310a and implements the processing such as remote copying. The input/output process program 1280a is executed by the processor 1310a and implements the processing with respect to the IO request received by the IO transmission-reception unit 1320a.

The copy-pair management information 1210a is information for managing a copy pair including a logical volume provided by the storage system 300a. A copy pair is two logical volumes that are an object of remote copying. The remote copying processing will be described below in greater detail with reference to FIG. 13 and FIG. 14. The copy pair management information 1210a will be described below in greater detail with reference to FIG. 9.

The volume management information 1250a is information for managing logical volumes provided by the storage system 300a. The volume management information 1250a will be described below in greater detail with reference to FIG. 10.

The logical storage volume management information 1260a is information to be used by the logical storage program 1220a and holds information for converting to the logical volume ID that is inherently held by the storage system 300a. The logical storage copy pair management information 1270a is information to be used by the logical storage program 1220a and holds information for converting a group ID that is used in copy pair management. The logical storage copy pair management information 1270a will be described below in greater detail with reference to FIG. 8. The logical storage management information 1290a is information to be used by the logical storage program 1220a and holds information such as logical storage ID and cache size that has been allocated to the logical storage.

The management terminal 1600 is connected to the storage controller 1000 (1000a, 1000b) provided in the storage system 300. The management terminal 1600 comprises a processor, a memory, and an interface (none is shown in the figure). The management terminal 1600 transmits the information inputted by the system user (user) to the storage controller 1000 (1000a, 1000b) of the storage system 300.

The storage system 300b comprises a storage controller 1000b and disk drives 1500. The storage controller 1000b comprises a cache memory 1100b, an I/O controller 1300b, a shared memory 1200b, and a disk controller 1400b. Furthermore, the shared memory 1200b holds copy pair management information 1210b, a copy management program 1230b, an input/output process program 1280b, a data transfer frame 1240b, and volume management information 1250b. These information and programs are identical to the respective information and programs corresponding to the storage control unit 1000a, that is, copy pair management information 1210a, copy management program 1230a, input/output process program 1280a, data transfer frame 1240a, and volume management information 1250a, and the explanation thereof is herein omitted.

The processing implemented in one embodiment of the present invention will be schematically explained below.

Figure 2A:
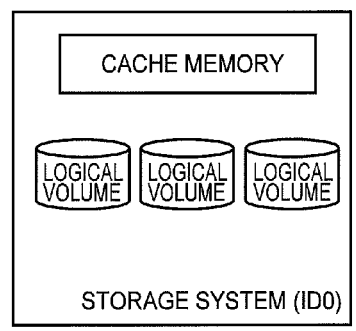
FIG. 2A is an explanatory drawing illustrating a storage system without storage logical partitioning.
Figure 2B:
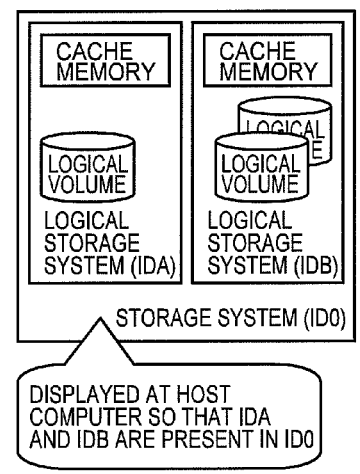
FIG. 2B is an explanatory drawing illustrating main features of the storage system in which the storage logical partitioning function has been actuated.

FIG. 2A is an explanatory drawing illustrating a storage system without storage logical partitioning. FIG. 2B is an explanatory drawing illustrating main features of the storage system in which the storage logical partitioning function has been actuated. The storage system 300a has a function of providing a logical volume as a storage resource and a cache memory for improving the performance to the host computer 200 and management computer 100. The cache memory is faster than the storage resources such as the disk drive 1500. The cache memory temporarily stores logical volume data and operates as part of the logical volume. For this reason, the host computer 200 and the like is not conscious about the presence of cache memory. During storage logical partitioning, the storage system 300a partitions the logical volumes and cache memory of the device itself and generates logical storage systems (FIG. 2B). In order to distinguish the logical storage system from the storage system prior to partitioning, the logical storage system is usually assigned with a logical identifier (for example, IDA, IDB) that is different from the storage system identifier (ID0) prior to partitioning.

FIG. 3A is an operation diagram created under an assumption that a storage system comprising a storage logical partitioning function and a storage system that does not comprise a storage logical partitioning function are linked. FIG. 3B is an operation diagram relating to the case where a storage system comprising a storage logical partitioning function and a storage system that does not comprise a storage logical partitioning function are linked, this operation diagram relating to the embodiment of the present invention. The storage system comprising a storage logical partitioning function is termed a new storage system, and the storage system that does not comprise a storage logical partitioning function is termed an old storage system. If the storage logical partitioning is performed, then a plurality of ID are generated inside one new storage system, as shown in FIG. 2B. After the storage logical partitioning function has been used, the new storage system communicates with another new storage system based on the ID of the logical storage system. However, the old storage system that does not comprise a storage logical partitioning function (for example, the storage system 300b) identifies the storage system of linking destination based on the ID assigned to the storage system. For this reason, as shown in FIG. 3A, the old storage system cannot be linked to the new storage system (for example, the storage system 300a). Accordingly, in the present embodiment, as shown in FIG. 3B, when the new storage system 300a is linked to the old storage system, an ID identical to that of the new storage system is assigned to one of a plurality of present logical storage systems and this storage system operates as a representative logical storage system. This operation is mainly implemented by the processor 1310a using the logical storage management information 1290a of the shared memory 1200a and executing the logical storage program 1220a. This operation will be referred to as a representative mode of storage logical partitioning. The new storage system 300a can be linked to the old storage system 300b by this representative mode. For example, in FIG. 3B, the logical storage system (IDB in FIG. 3A) located in the new storage system 300a executes the representative mode, thereby operating as ID0 identical to the ID of the new storage system. As a result, the old storage system and new storage system can communicate.

Figure 4A:
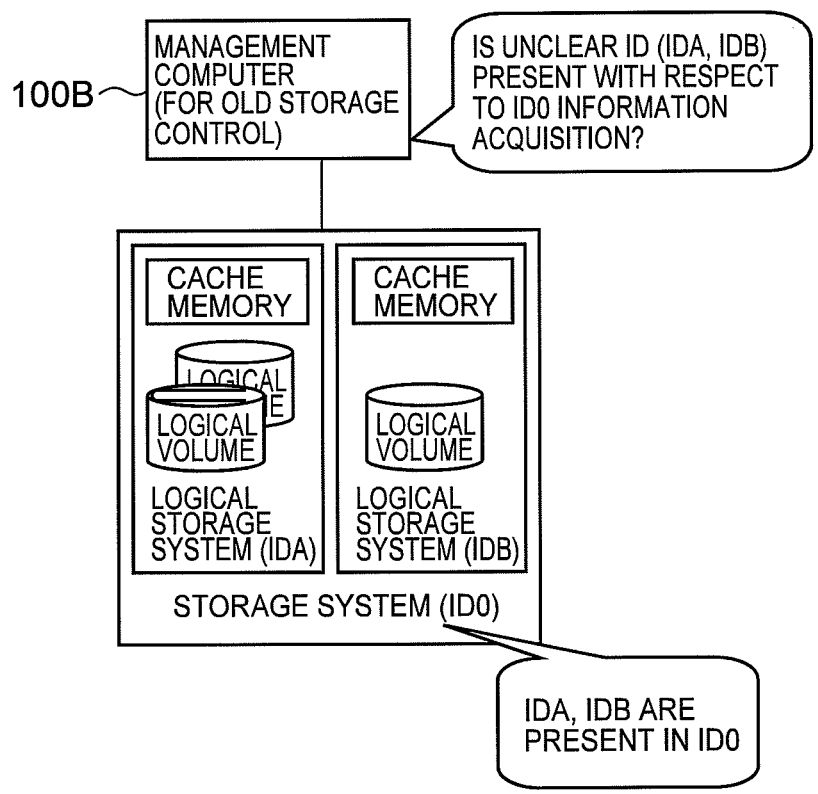
FIG. 4A is an operation diagram based on an assumption that a management computer that is not associated with the storage logical partitioning function controls a storage system comprising the storage logical partitioning function.
Figure 4B:
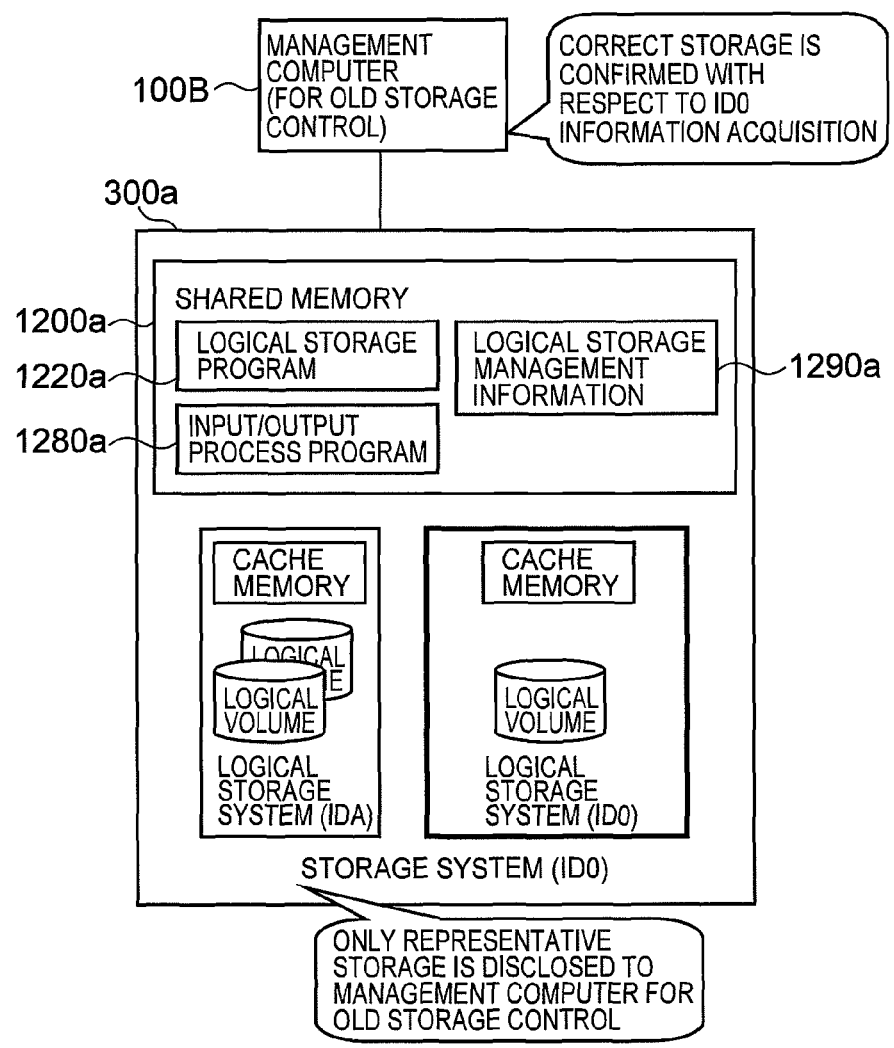
FIG. 4B is an operation diagram relating to the case where a management computer that is not associated with the storage logical partitioning function controls a storage system comprising the storage logical partitioning function, this operation diagram relating to the embodiment of the present invention.

FIG. 4A is an operation diagram based on an assumption that a management computer that is not associated with the storage logical partitioning function controls a storage system comprising the storage logical partitioning function. FIG. 4B is an operation diagram relating to the case where a management computer that is not associated with the storage logical partitioning function controls a storage system comprising the storage logical partitioning function, this operation diagram relating to the embodiment of the present invention.

Here, an example will be explained in which the management computer 100 is a computer 100B that is not associated with the storage logical partitioning function. The management computer 100B makes an inquiry by issuing a storage device reference indication with respect to information of the storage system 300a itself to the storage system 300a connected to the management computer 100B in order to recognize the storage system that is a management object. This inquiry is performed with respect to each port of the storage system 300a. When the storage system 300a performs the storage logical partitioning, it reports to the management computer 100B that a plurality of logical storage systems are present in one storage system. This report includes an ID (IDA, IDB) assigned to a logical storage system that is different from the ID of the storage system. Because the management computer 100B is not associated with the storage logical partitioning function, when a plurality of ID indicating logical storage systems are received from the storage system, the ID of the logical storage system cannot be recognized. Therefore, the report contents cannot be comprehended. As a result, for example, the processing is stopped. Accordingly, in the present embodiment, as shown in FIG. 4B, the report of ID (ID0) of only the representative logical storage system is enabled in the new storage system so that an obstacle does not occur to the management computer that does not comprise the storage logical partitioning function. This operation is mainly implemented by the processor 1310a executing the logical storage program 1220a and input/output process program 1280a. As a result, the management computer 100B can recognize the ID indicating the representative logical storage system.

Figure 5A:
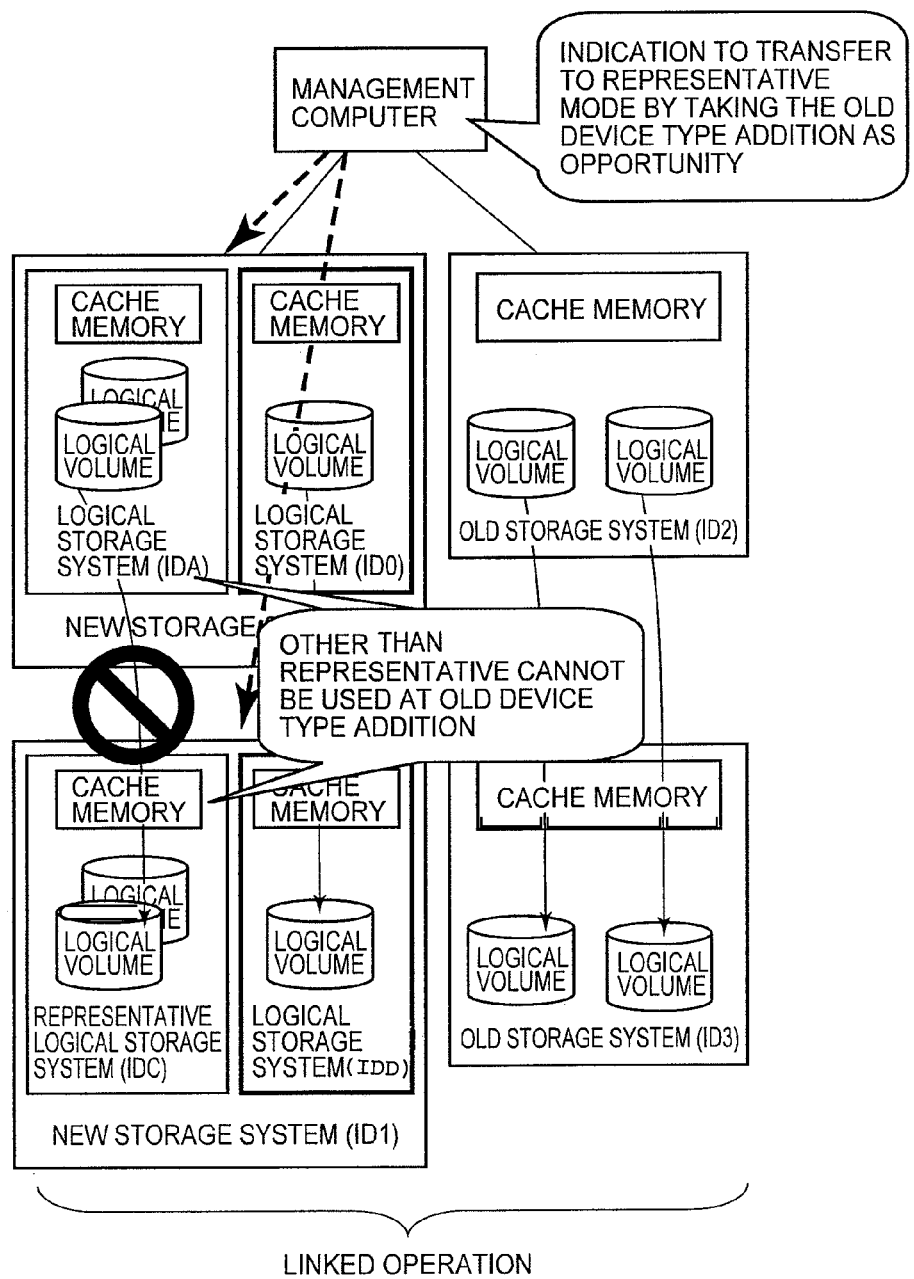
FIG. 5A illustrates the concept of operation in the case where a storage system that does not comprise the storage logical partitioning function is added to a computer system operating a plurality of storage systems comprising the storage logical partitioning function.

FIG. 5A illustrates the concept of operation in the case where a storage system that does not comprise the storage logical partitioning function is added to a computer system operating a plurality of storage systems comprising the storage logical partitioning function. FIG. 5B illustrates the concept of operation in the case where a storage system that does not comprise the storage logical partitioning function is added to a computer system operating a plurality of storage systems comprising the storage logical partitioning function, this operation relating to an embodiment of the present invention.

FIG. 5A illustrates a state after the old storage systems ID2, ID3 have been added to a system in which the new storage system ID0 is linked to a new storage system ID1 (actually, a system in which logical storages IDA, IDB located in the new storage system ID0 are linked respectively to the logical storages IDC, IDD of the new storage system ID1). In this case, the management computer 100 performs control at a functional level matching that of the old storage system with the fewest number of functions from among all the linked storage systems. This is done so that the management computer 100 does not indicate a function that is not actually installed at the storage system with few functions. Following the indication of the management computer 100, the new storage systems ID0, ID1 operate in the representative mode. As shown in FIG. 4B, during the operation in the representative mode, the new storage system does not report the presence of a logical storage system other than the representative logical storage system to the management computer 100. As a result, as shown in FIG. 5A, the management computer 100 cannot control the logical storage system (IDA) that have been used heretofore if the old storage system is added. By contrast, in the present embodiment, as shown in FIG. 5B, the new storage system 300a can receive from the management computer 100 the control indication relating to the logical storage system other than the representative logical storage system in order to enable the control of such a logical storage system that could not be controlled. This function is mainly implemented by the processor 1310a executing the logical storage program 1220a and input/output process program 1280a. The management computer 100 sends an inquiry to the new storage system before the addition of the old storage system, and in the case where the presence of the logical storage system configured by the new storage system has already been recognized, the control of the logical storage system is possible. Here, as described hereinabove, the management computer 100 acquires by an inquiry the information relating to the presence of the logical storage system that can be managed by the management computer 100, before the linking of the old storage system is started, by means of the processor 120 executing the storage management program 112. As a result, because the presence recognition has also been done with respect to the logical storage system configured in the new storage system that started operating the representative mode via linking, as shown in FIG. 5B the control indication can be made to the logical storage system (IDA) different from the representative logical storage system by the processor 120 executing the storage logical program 112.

The operation of the storage logical partitioning function will be described below in greater detail.

Figure 6:
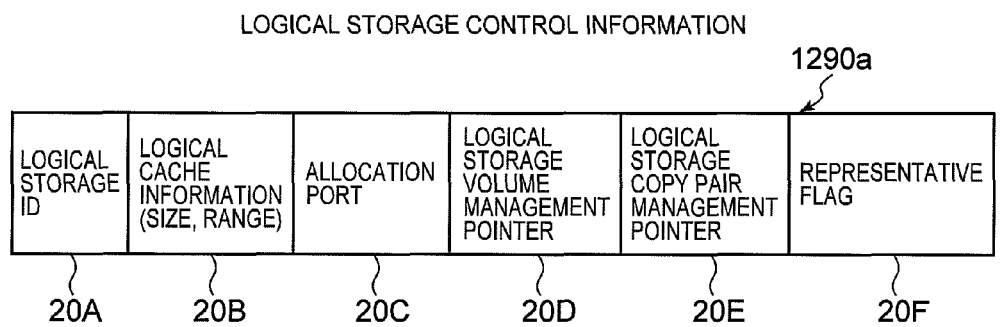
FIG. 6 is a configuration drawing illustrating the logical storage information that is managed in the storage system of the embodiment of the present invention.

FIG. 6 is a configuration drawing illustrating the logical storage information that is managed in the storage system of the embodiment of the present invention.

Logical storage information 1290a includes a logical storage ID 20A, logical cache information 20B, an allocation port 20C, a logical storage volume management pointer 20D, a logical storage copy pair pointer 20E, and a representative flag 20F.

The logical storage ID 20A is a unique identifier assigned to the logical storage system. In the present embodiment, an identifier of the storage system 300a is assigned as an identifier of one predetermined logical storage system (also referred to as "representative logical storage system") from among a plurality of logical storage systems. Logical cache information 20B is information used for partitioning the cache memory 1100a located inside the storage controller 1000a; this information includes partitioning capacity information (for example, a capacity of 3 GB), which is information describing the capacity of a partitioned portion) and cache memory area information (start address, end address) describing the partitioned portion. The allocation port 20C hold information indicating a port that was allocated to the logical storage system from among the ports of a plurality of data communication link 500 present in the input/output controller 1300a of the storage controller 1000a. For example, if the port is allocated to the logical storage system, the data describing this port is held as "1". For example, when eight ports are present in the storage controller 1000a and two of these ports are allocated to the logical storage system, the information of the allocation port is "11000000". The logical storage volume management pointer 20D is information indicating the location of the logical storage volume management information 1260a saved in the shared memory 1200a. The logical storage copy pair management pointer 20E is information indicating the location of the logical storage copy pair management information 1270a saved in the shared memory 1200a. The representative flag 20F is information indicating whether the storage system is a representative logical storage system. When the corresponding logical storage system is a representative logical storage system, the representative flag information is set, for example, to "1".

Figure 7:
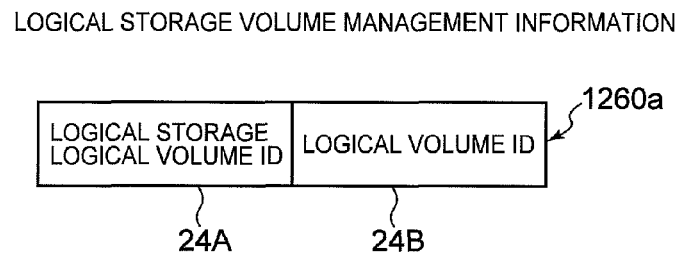
FIG. 7 is a configuration drawing illustrating the logical storage volume management information that is managed in the storage system of the embodiment of the present invention.

FIG. 7 is a configuration drawing illustrating the logical storage volume management information that is managed in the storage system of the embodiment of the present invention.

The logical storage volume management information 1260a includes a logical storage logical volume ID 24A and a logical volume ID 24B. The logical storage logical volume ID 24A is an identifier that is individually assigned so as to enable the unique identification of a logical volume in a logical storage system. The logical volumes ID 24B are identifiers managed in bulk by the storage controller 1000a with respect to the logical volumes for which logical volumes of the logical storage system were allocated. Here, the logical volumes managed in bulk by the storage controller 1000a will be referred to as "enclosure logical volume" in order to distinguish it from the logical volume in the logical storage system.

Figure 8:
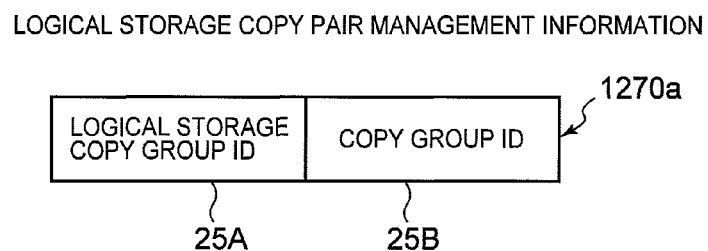
FIG. 8 is a configuration drawing illustrating the logical storage copy pair management information that is managed in the storage system of the embodiment of the present invention.

FIG. 8 is a configuration drawing illustrating the logical storage copy pair management information that is managed in the storage system of the embodiment of the present invention.

The logical storage copy pair management information 1270a includes a logical storage copy group ID 25A and a copy group ID 25B. The logical storage copy group ID 25A is a unique identifier in a logical storage system relating to a copy group that manages the copy pairs in bulk. The copy group ID 25B is an identifier of a copy group that is managed in bulk by the storage controller 1000a and corresponds to the copy group ID assigned to the logical storage system. Here, the copy group ID that is managed in bulk by the storage controller 1000a will be referred to as an enclosure copy group ID.

Figure 9:
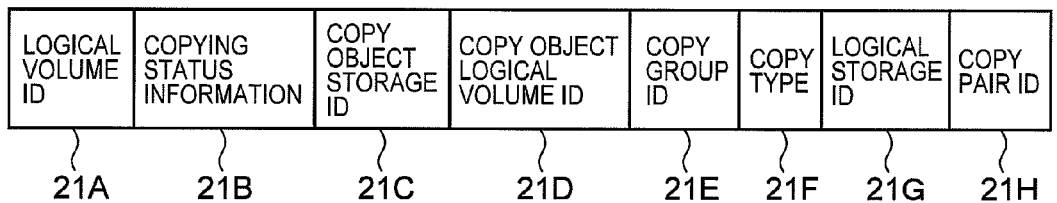
FIG. 9 is a configuration drawing of copy pair management information managed in the storage system of the embodiment of the present invention.

FIG. 9 is a configuration drawing of copy pair management information managed in the storage system of the embodiment of the present invention.

The copy pair management information 1210 (1210a, 1210b) includes a logical volume ID 21A, copying status information 21B, a copy object storage ID 21C, a copy object logical volume ID 21D, a copy group ID 21E, a copy type 21F, a logical storage ID 21G, and a copy pair ID 21H.

The logical volume ID 21A is a unique identifier of a logical volume provided by the storage system 300 that stores the copy pair management information 1210. The copying status information 21B indicates the present status of copying with respect to the logical volume identifier by the logical volume ID 21A. More specifically, the copying status information 21B indicates which status is assumed by the logical volume identified by the logical volume ID 21A: primary volume, copy object volume, initial copying, suspending, or abnormal. The copy object logical volume ID 21D is a unique identifier of a logical volume that becomes a copy pair with the logical volume identified by the logical volume ID 21A. In other words, the copy object logical volume ID 21D is a unique identifier of a logical volume that becomes a copying destination or copying source for data stored in the logical volume identified by the logical volume ID 21A. The copy object storage ID 21C is a unique identifier of a storage system 300 providing a logical volume that forms a copy pair with the logical volume identified by the logical volume ID 21A. In other words, the copy object storage ID 21C is a unique identifier of the storage system 300 providing a logical volume that is identified by the copy object logical volume ID 21D. The copy pair ID 21H is a unique identifier of a copy pair comprising a logical volume identified by the logical volume ID 21A and the logical volume identified by the copy object logical volume ID 21D.

The copy group ID 21E is a unique identifier of a copy group to which the copy pair identified by the copy pair ID 21H belongs. The storage system 300 manages a copy group comprising at least one copy pair. Therefore, the management computer 100 can designate a copy group and indicate suspension, restart, or cancellation of the remote copying operation. The copy type 21F indicates the class of copying executed with respect to a copy pair that is identified by the copy pair ID 21H. More specifically, the copy type 21F stores either synchronous copying or asynchronous copying. The logical storage ID 21G is an identifier that enables unique identification of a logical storage system. It is used in exchange with the storage logical partitioning function.

Figure 10:
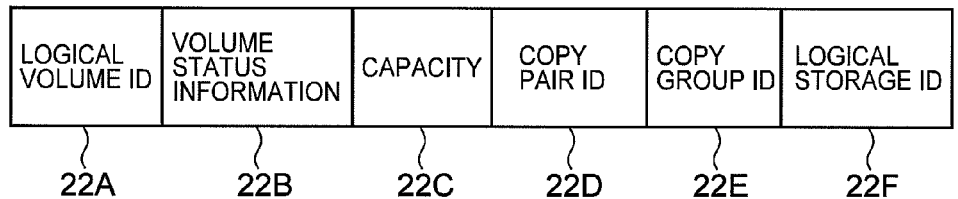
FIG. 10 is a configuration drawing of volume management information managed in the storage system of the embodiment of the present invention.

FIG. 10 is a configuration drawing of volume management information managed in the storage system of the embodiment of the present invention.

The volume management information 1250 (1250*a*, 1250*b*) includes a logical volume ID 22A, volume status information 22B, a capacity 22C, a copy pair ID 22D, a copy group ID 22E, and a logical storage ID 22F.

The logical volume ID 22A is a unique identifier of a logical volume provided by a storage system 300 that stores the volume management information 1250. The volume status information 22B indicates the present status of the logical volume identified by the logical volume ID 22A. More specifically, the volume status information 22B stores at least one of primary, secondary, normal, abnormal, or not-used statuses. For example, when the logical volume identified by the logical volume ID 22A is a primary volume, the volume status information 22B stores "primary volume". Further, when the logical volume identified by the logical volume ID 22A is a copy object volume, the volume status information 22B stores "secondary volume". When the logical volume identified by the logical volume ID 22A can be normally accessed by the host computer 200, the volume status information 22B stores "normal". When the logical volume identified by the logical volume ID 22B cannot be normally accessed by the host computer 200, the volume status information 22B stores "abnormal". For example, when the disk drive 1500 malfunctions or remote copying fails, the volume status information 22B stores "abnormal". When no data are stored in the logical volume indicated by the logical volume ID 22A, "not used" is stored in the volume status information 22B.

The capacity 22C is a capacity of the logical volume indicated by the logical volume ID 22A. The copy pair ID 22D is a unique identifier including the logical volume identified by the logical volume ID 22A. The group ID 22E is a unique identifier of a copy group including the copy pair identified by the copy pair ID 22D. The logical storage ID 22F is a unique identifier enabling the unique identification of a logical storage system. This identifier is used in storage logical partitioning function exchange.

Figure 11:
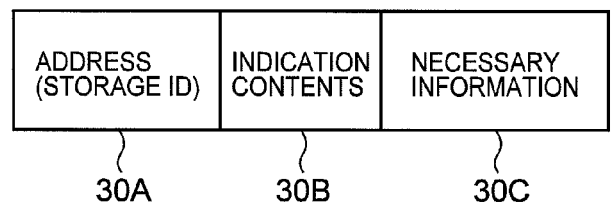
FIG. 11 is a configuration drawing of an IO request for performing exchange between the storage system and the management computer in the embodiment of the present invention.

FIG. 11 is a configuration drawing of an IO request for performing exchange between the storage system and management computer in the embodiment of the present invention.

The IO request 7300 is an input/output request issued by the management computer 100 or host computer 200 and transmitted to the storage system 300. The IO request 7300 includes an address 30A, indicated contents 30B, and necessary information 30C.

The address 30A stores an identifier of a logical volume and an identifier of the storage system 300 that is a transmission destination of an IO request 7300. In the present embodiment, for example, in the case of the IO request 7300 sent by the host, the address 30A stores the storage ID and volume ID provided to the host computer 200. An indicated contents 30B is the contents of processing indicated by the IO request 7300. For example, the indicated contents 30B is a remote copying control indication, storage reference indication, or data access indication. More specifically, indications to start, suspend, restart, cancel, or acquire status are stored as the remote copying control indication. Further, storage system information acquisition is stored as a storage reference indication. Write or read is stored as a data access indication.

Remote copying configuration information, option information that complements the IO request 7300, and data that are requested to be read by the IO request 7300 are stored in necessary information 30C. For example, a copy type, a storage ID of copy destination, a logical volume ID of copy destination, a storage ID of copy source, a logical volume ID of copy source, a copy group ID, and a copy option are included in the copy configuration information. Further, when a request is issued from the management computer 100, an emulation level that is information indicating the functional level provided by computer system is stored in the necessary information 30C.

Figures 15, 16:
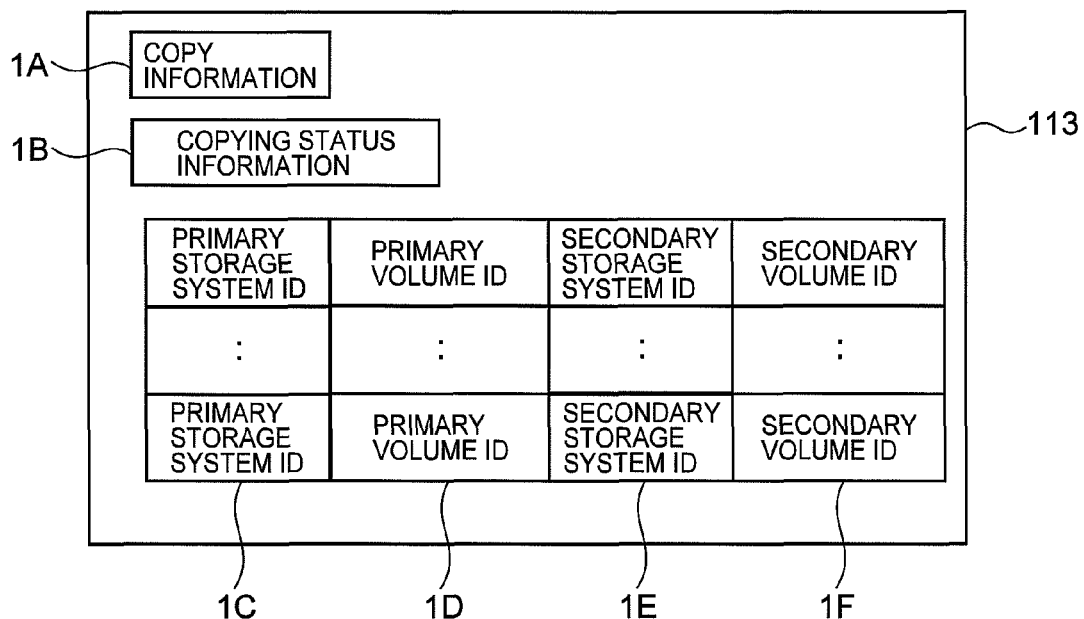
FIG. 15 is an explanatory drawing of the emulation level.
FIG. 16 is a configuration drawing of a copy information table managed by the management computer of the embodiment of the present invention.

FIG. 15 is an explanatory drawing of the emulation level.

As shown in FIG. 15, a function provided by the storage system or computer system can be defined by employing the emulation level. For example, when the emulation level is a, the storage logical partitioning function cannot be used, but when the emulation level is $\gamma$, storage logical partitioning function can be used. Further, when the emulation level is $\alpha$, the remote copying function cannot be used, but at the emulation level $\beta$, the remote copying function can be used. The emulation levels satisfy the following relationship: $\alpha<\beta<\gamma$.

Figure 13:
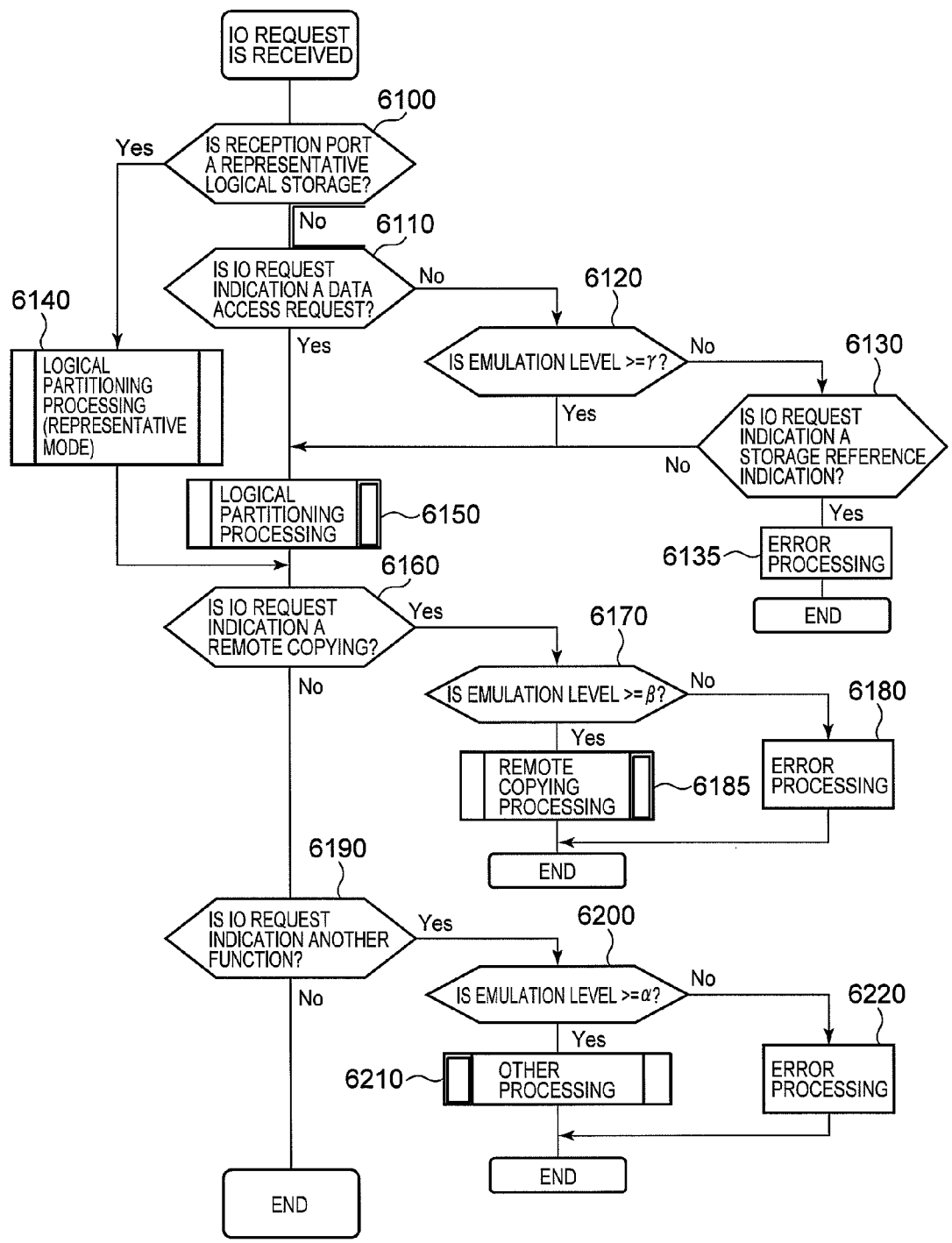
FIG. 13 is a flow chart relating to processing during IO request reception in a storage system comprising the storage logical partitioning function of the embodiment of the present invention.

FIG. 13 is a flowchart relating to processing during IO request reception in a storage system comprising the storage logical partitioning function of the embodiment of the present invention.

If the storage controller 1000*a* receives the IO request 7300, the processor 1310*a* of the I/O controller 1300*a* specifies a port that received the IO request 7300. The processor 1310*a* then refers to logical storage management information 1290*a* located in the shared memory 1200*a* and specifies the logical storage system to which the port corresponds. In the case where the specification result indicated that the representative flag 20F of the corresponding logical storage management information 1290*a* is "1" (step 6100, Yes), the storage logical partitioning processing is implemented in the representative mode to disclose the logical storage system to the external device in a status identical to the usual storage system (step 6140). Implementing the storage logical partitioning processing in the representative mode means that the logical storage ID is identical to the storage ID of the storage system 300*a*, in other cases the processing is identical to the below-described storage logical partitioning processing.

When the result of specifying a logical storage system is such that the representative flag 20F of the logical storage information 1290*a* corresponding to the logical storage system is "0" (step 6100, No), the processor 1310*a* examines the indicated contents 30B of the IO request 7300 and determines whether this request is a data access request (step 6110).

When the IO request 7300 is a data access request (step 6110, Yes), the below described storage logical partitioning processing is implemented (step 6150). On the other hand, when the IO request 7300 is not a data access request (step 6110, No), the emulation level of the IO request 7300 is studied. When the emulation level is $\gamma$ or higher (step 6120, Yes), or when the emulation level is below $\gamma$ (step 6120, No)

and the indicated contents 30B of the IO request 7300 is not the storage reference indication (step 6130, No), the storage logical partitioning processing is implemented (step 6150).

As a result, even when the emulation level is a low value indicating that the logical partitioning function is not present, if the IO request 7300 is not a storage reference indication, the IO request 7300 is not immediately considered as an error.

When the emulation level of the IO request is below γ (step 6120, No) and the indicated contents 30B of the IO request 7300 is the storage reference indication (step 6130, Yes), error processing is executed by which an error message indicating that the storage system described in the address 30A of the IO request 7300 is not present is reported to the transmission source (step 6135), and the processing is ended. As a result, the ID of logical storage system can be prevented from being transmitted to the management computer 100. Therefore, no problem is encountered even when the management computer 100 cannot recognize the logical storage system.

Processing such as remote copying is implemented after the logical partitioning processing (step 6140, step 6150) has been completed. Thus, when the indicated contents 30B of the IO request 7300 is the remote copying control (step 6160, Yes), the processor 1310a examines whether the emulation level located in the IO request 7300 can be remote copying. If the emulation level is β or more (step 6170, Yes), the processor 1310a implements remote copying (step 6185). On the other hand, if the emulation level is less than β, the processor 1310a executes the error processing by reporting an error message indicating that the remote copying processing cannot be executed in the storage system to the request source of the IO request 7300 (step 6180).

When the indicated contents 30B of the IO request 7300 is the execution of a predetermined function (for example, local copying) other than remote copying (step 6190, Yes), the processor 1310a examines whether the emulation level located in the IO request 7300 can be the execution of the predetermined function. If the emulation level is α or more (step 6200, Yes), the processor 1310a executes the predetermined function (step 6210). On the other hand, if the emulation level is less than α, the processor 1310a executes the error processing by reporting an error message indicating that the local copying processing cannot be executed in the storage system to the request source of the IO request 7300 (step 6220).

With the above-described processing, even when the emulation level is a low value indicating that the logical partitioning function is not present, if the IO request 7300 is not a storage reference indication, the logical partitioning processing can be implemented and, if the system configuration can link and execute a predetermined function such as remote copying, then the predetermined function can be executed.

The logical partitioning processing executed by the storage logical partitioning function of the storage system 1000a will be explained below.

Figure 14:
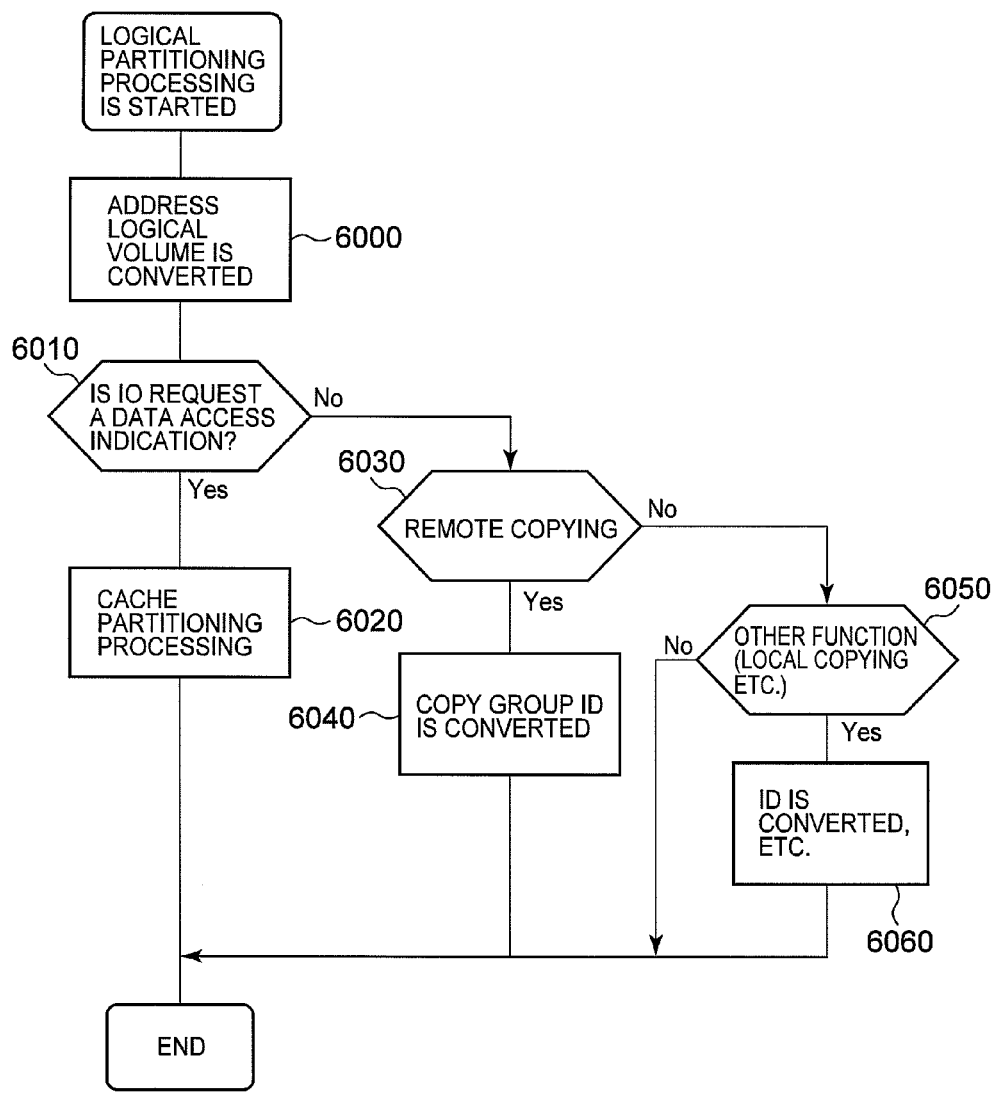
FIG. 14 is a flowchart of logical partitioning processing executed by the storage system of the embodiment of the present invention.

FIG. 14 is a flowchart of logical partitioning processing executed by the storage system of the embodiment of the present invention.

In logical partitioning processing, the processor 1310a of the I/O controller 1300a refers to the address 30A of the IO request 7300 received by the IO transmission-reception unit 1320a. Then, the processor 1310a uses the logical storage logical volume management information 1260a located in the shared memory 1200a and converts the logical volume ID described in the address 30A to a enclosure logical volume ID (step 6000). The processor 1310a then determines whether the IO request 7300 is a data access indication. When the IO request 7300 is a data access indication (step 6010, Yes), the processor 1310a reads the input/output process program 1280a from the shared memory 1200a. After the input/output process program 1280a has been read, the processor 1310a implements the partition processing of the cache according to the input/output process program 1280a (step 6020). The partition processing of the cache is a processing by which the cache memory 1100a held in the storage controller 1000a can be used with restriction only to the region stipulated by the logical cache information 20B of the logical storage information 1290a. Actually, the processor 1310a can implement data arrangement in the cache memory 1100a by using as a logical cache memory the region that is stipulated by the logical cache information 20B.

When the indicated contents 30B of the IO request 7300 is not the data access indication (step 6010, No), the processor 1310a determines whether it is another function of the storage system. In step 6030, the processor 1310a determines whether it is a remote copying control indication. When it is a remote copying control indication (step 6030, Yes), the processor performs the conversion of the copy group ID. Thus, the processor 1310a, refers to the logical storage copy pair management information 1270a from the shared memory 1200a and specifies a enclosure copy group ID corresponding to the copy group ID indicated in the necessary information 30C of the IO request 7300 in order to convert the copy group ID (step 6040).

Further, when a function of the storage system other than the remote copying, for example, a local copying function of implementing copying between logical volumes in the storage system, is present (step 6050, Yes), the processor 1310a executes the conversion procedure of copy group ID that becomes necessary with the local copy function (step 6060).

The remote copying processing operation implemented between a plurality of storage systems 300a, 300b of the embodiment of the present invention will be described below.

The remote processing has two processes: initial copying and stationary copying. The initial copying is a processing in which contents of the logical volume of the storage system that is the copying destination is matched with contents of the logical volume that is the copying source. The stationary copying is a copying processing that is implemented after the end of the initial copying; in this processing, the host computer 200 copies the writing into the logical volume that is the copying source to the logical volume that is the copying destination.

Figure 19:
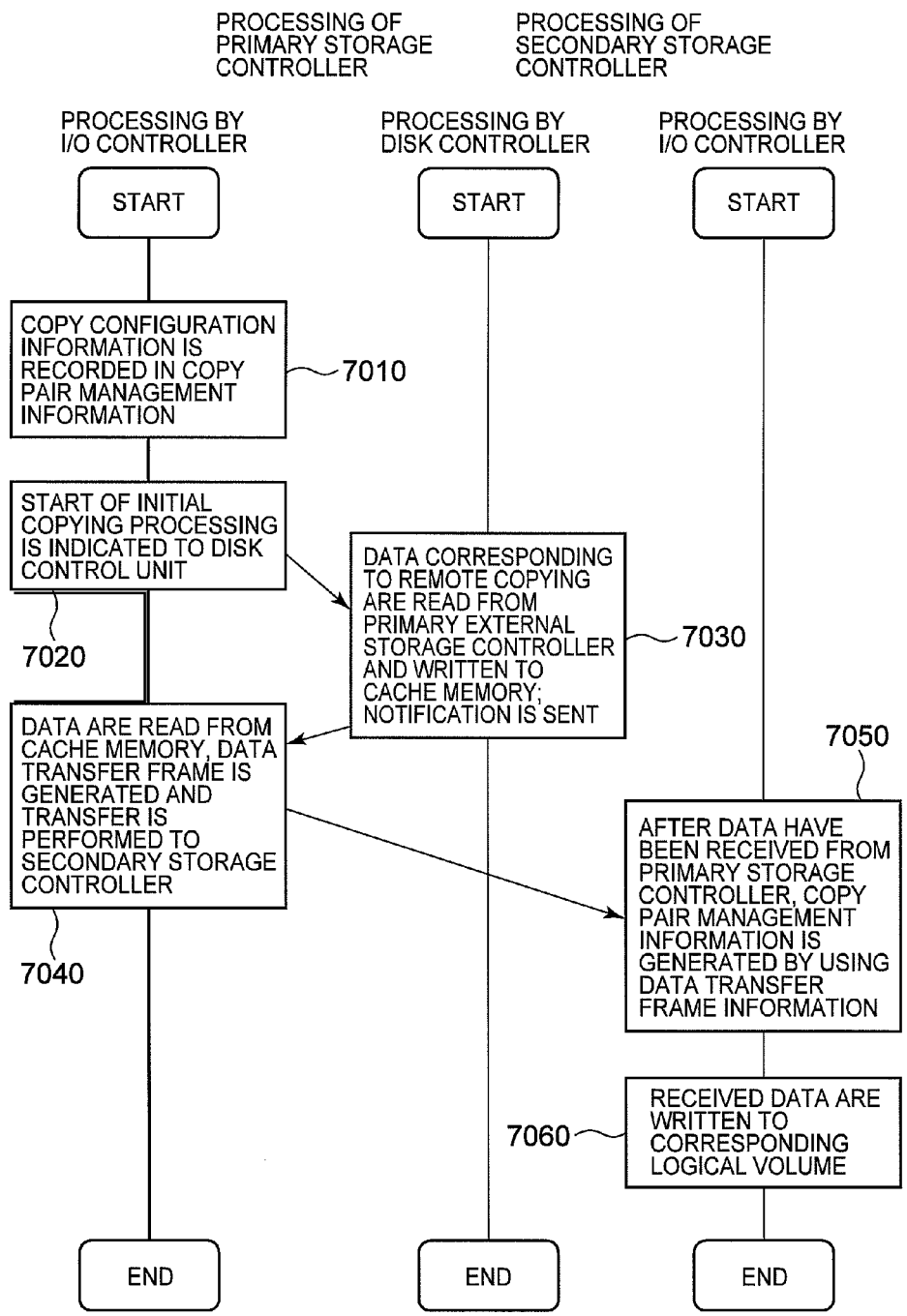
FIG. 19 is a flowchart relating to the initial copying in the remote copying operation implemented in the storage system of the embodiment of the present invention.

FIG. 19 is a flowchart relating to the initial copying in the remote copying operation implemented in the storage system of the embodiment of the present invention. In the present flowchart, the case of remote copying from the logical volume of a representative logical storage system of the storage system 300a to the logical volume of the storage system 300b is described by way of an example.

The I/O controller 1300a of the storage controller 1000a of the storage system 300a that is the copying source (in the explanation of this processing, this storage system will be referred to hereinbelow as a primary storage system 300a) stars the initial copying processing if the IO request 7300 indicating the start of remote copying is received. Before this point in time, the storage logical partitioning processing (step 6140 step 6150) has already been implemented, and the I/O controller 1300a of the primary storage system 300a has acquired the enclosure copy group ID relating to the remote copying.

The I/O controller 1300a of the primary storage system 300a creates the copy pair management information 1210a based on the copy configuration information extracted from the IO request 7300 (step 7010). More specifically, the I/O controller 1300*a* stores "initial copying" in the copying status information 21B of the copy pair management information 1210*a*. Then, the I/O controller 1300*a* stores the logical volume ID acquired by the storage logical partitioning processing as a logical volume of the copying source in the logical volume ID 21A of the copy pair management information 1210*a*. Further, the I/O controller 1300*a* also stores the storage ID of the copying destination that is contained in the copy configuration information in the copy object storage ID 21C of the copy pair management information 1210*a*. The processor 1310*a* of the I/O controller 1300*a* stores the logical volume ID of the copy destination contained in the copy configuration information in the copy object volume ID 21D of the copy pair management information 1210*a*. Then, the I/O controller 1300*a* stores a value that does not overlap other copy pairs in the copy pair ID 21H of the copy pair management information 1210*a*. The I/O controller 1300*a* then stores the copy group ID acquired by the storage logical partitioning processing in the copy group ID 21E of the copy pair management information 1210*a*. Then, the I/O controller 1300*a* stores the copy type contained in the copy configuration information in the copy type 21F of the copy pair management information 1210*a*.

The I/O controller 1300*a* of the primary storage system 300*a* then indicates the start of initial copying processing to the disk control unit 1400*a* (step 7020).

As a result, the disk controller 1400*a* reads data from the disk drive 1500 corresponding to the logical disk identified by the logical volume ID 21A of the copy pair management information 1210*a*. The disk controller 1400*a* then stores the data that were read out in the cache memory 1100*a* (step 7030).

Further, the disk controller 1400*a* sends an address of the block from which data have been read, the data length of the data that were read out, and the address on the cache memory 1100*a* where the data have been stored to the I/O controller 1300*a* of the primary storage system 300*a*.

As a result, the I/O controller 1300*a* creates a data transfer frame 1240 based on the information sent from the copy pair management information 1210*a* and disk controller 1400*a*.

Figure 12:
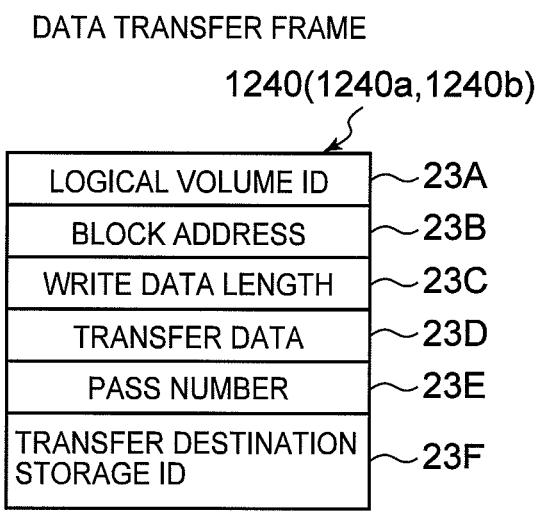
FIG. 12 is a configuration drawing of a data transfer frame that is transmitted and received during remote copying implementation between the storage systems of the embodiment of the present invention.

FIG. 12 is a configuration drawing of a data transfer frame that is transmitted and received during the remote copying between the storage systems of the embodiment of the present invention.

The data transfer frame 1240 includes a logical volume ID 23A, a block address 23B, a write data length 23C, transfer data D, a path number 23E, and a transfer destination storage ID 23F.

Returning to FIG. 19, the I/O controller 1300*a* of the primary storage system 300*a* stores the copy object storage ID 21C of the copy pair management information 1210*a* in the logical volume ID 23A of the data transfer frame 1240. Then, the I/O controller 1300*a* stores the address of the block sent from the disk controller 1400*a* in the block address 23B of the data transfer frame 1240. Then, the I/O controller 1300*a* stores the data length sent from the disk controller 1400*a* in the transfer data length 23C of the data transfer frame 1240. Then, the I/O controller 1300*a* saves all the data that have been stored in the cache memory 1100*a* or part thereof in the transfer data 23D of the data transfer frame 1240. Then, the I/O controller 1300*a* stores the order in which the data transfer frame 1240 was created in the initial copying in the path number 23E of the data transfer frame 1240. In addition, the I/O controller 1300*a* stores the copy object storage ID 21C of the copy-pair management information 1210 in the transfer destination storage ID 23F of the data transfer frame 1240.

The I/O controller 1300*a* of the primary storage system 300*a* transmits the created data transfer frame 1240 to the secondary storage system 300*b* that is the copy destination (step 7040). The transmitted data transfer frame 1240 has added thereto the identifier of the storage system that is the transmission source. With the settings of the present flowchart, the remote copying is performed from the logical volume of the representative logical storage system of the storage system 300*a* to the logical volume of the storage system 300*b*, and the transmission is performed after adding an identifier that indicates the primary storage system 300*a* as the identifier of the representative logical storage system. As a result, the storage system can be recognized in the storage system 300*b* without any obstacle.

As a result, the I/O controller 1300*b* of the storage controller 1400*b* of the secondary storage system 300*b* receives the data transfer frame 1240. Then, the I/O controller 1300*b* of the secondary storage system 300*b* generates a copy pair management information 1210*b* based on the received data transfer frame 1240 (step 7050). More specifically, the I/O controller 1300*b* stores the logical volume ID 23A of the received data transfer frame 1240 in the logical volume ID 21A of the copy pair management information 1210*b*. Then, the I/O controller 1300*b* stores the "initial copying" in the copying status information 21B of the copy pair management information 1210*b*. When the secondary storage system 300*b* comprises the storage logical partitioning function, it is necessary to convert the logical volume ID of the copy destination to the enclosure logical volume ID. Then, the I/O controller 1300*b* stores the identifier that indicates the primary storage system 300*a* of the transmission source that was transmitted as an addition to the received data transfer frame 1240 in the copy object storage ID 21C of the copy pair management information 1210*b*. Then, the I/O controller 1300*b* stores the identifier of the primary volume where the transfer data 23D of the data transfer frame 1240 have been stored in the copy object volume ID 21D of the copy pair management information 1210*b*. Then, the I/O controller 1300*b* writes the transfer data 23D of the data transfer frame 1240 in the logical volume identified by the logical volume ID 23A of the data transfer frame 1240 (step 7060).

In the primary storage system 300*a* and secondary storage system 300*b*, all the data of the primary volume are stored in the secondary volume by repeatedly executing the step 7030 to step 7060.

Then, the primary storage system 300*a* and secondary storage system 300*b* end the initial copying processing. If the primary storage system 300 ends the initial copying, the "primary volume" is stored in the copying status information 21B of the copy pair management information 1210*a*. The secondary storage system 300*b* then stores the "secondary volume" in the copying status information 21B of the copy pair management information 1210*b*.

Figure 20:
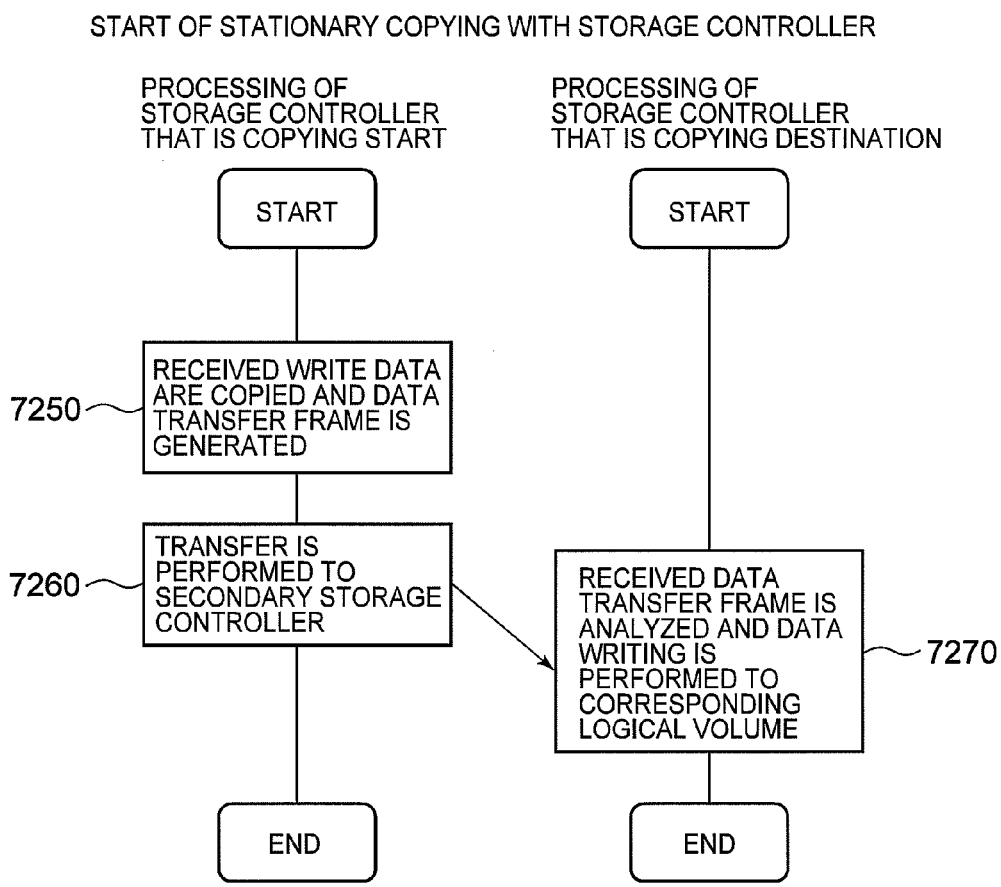
FIG. 20 is a flowchart relating to stationary copying in the remote copying implemented in the storage system of the embodiment of the present invention.

FIG. 20 is a flowchart relating to stationary copying in the remote copying implemented in the storage system of the embodiment of the present invention.

If the initial copying processing ends, the storage system 300*a* starts stationary copying processing. In other words, the storage systems 300*a*, 300*b* start the stationary copying processing after the data of the primary volume and the data of the secondary volume match each other.

If the storage controller 1000*a* of the primary storage system 300*a* receives the IO request 7300 that is a write request, the I/O controller 1300*a* extracts data that are required to be written (write data) from the necessary information 30C of the IO request 7300. Then, the I/O controller 1300*a* extracts a storage ID for providing a host and a volume ID for providing a host from the address 30A of the IO request 7300. Then, the I/O controller 1300a acquires the enclosure logical volume ID by using the storage logical partitioning function. Then, the I/O controller 1300a writes the extracted write data into the logical volume identified by the acquired enclosure logical volume ID.

The I/O controller 1300a then creates a data transfer frame 1240 (step 7250). More specifically, the I/O controller 1300a of the primary storage system 300a selects a copy pair management information 1210a for which the acquired logical volume ID and logical volume ID 21A match each other. Then, the I/O controller 1300a extracts the copy object storage ID 21C and copy object volume ID 21D from the selected copy pair management information 1210a. Then, the I/O controller 1300a stores the extracted copy object volume ID 21D in the logical volume ID 23A of the data transfer frame 1240. Then, the I/O controller 1300a stores the address of the block storing the write data in the block address 23B of the data transfer frame 1240. Then, the I/O controller 1300a stores the size of write data in the transfer data length 23D of the data transfer frame 1240. Then, the I/O controller 1300a stores all the write data or part thereof in the transfer data 23D of the data transfer frame 1240. Then, the I/O controller 1300a stores the sequence in which the transfer frame 1240 was created in the stationary copying in the path number 23E of the data transfer frame 1240. Then, the I/O controller 1300a stores the extracted copy object storage ID 21C in the transfer destination storage ID 23F of the data transfer frame 1240.

The I/O controller 1300a of the primary storage system 300a then transmits the created data transfer frame 1240 to the secondary storage system 300b (step 7260).

The I/O controller 1300b of the storage controller 1000b of the secondary storage system 300b receives the data transfer frame 1240. As a result, the I/O controller 1300b of the secondary storage system 300b writes the transfer data 23D of the data transfer frame 1240 in the logical volume identified by the logical volume ID 23A of the data transfer frame 1240 (step 7270). The storage systems 300a, 300b thereby end the stationary copying processing corresponding to one IO request.

The operation of the management computer 100 will be explained below.

FIG. 16 is a configuration drawing of a copy information table managed by the management computer of the embodiment of the present invention.

A copy information table 113 includes copy information 1A, copying status information 1B, and copy configuration information 1C to 1F. The copy information 1A includes a copy type, an emulation level, and copy option information. The copy type indicates whether the copying to be managed by the copy information table 113 is synchronous copying or asynchronous copying. The emulation level holds the minimum value from among the emulation levels held by all the storage systems 300a, 300b, etc., and storage management program 112 relating to the copying. Based on the emulation level, it is possible to determine whether it is a function that can be reliably executed by all the storage systems and management computer. The copy option information indicates whether writing is possible to the secondary volume when the remote copying is suspended. The suspension of the remote copying is the termination of remote copying based on the indication from the management computer 100.

The copying status information 1B indicates the present status of copying managed by the copy information table 113. More specifically, the copying status information 1B indicates which copying status is managed by the copying information table 113: initial copying, suspending, pair status, or abnormal.

The copy configuration information includes a primary storage system ID 1C, primary volume ID 1D, secondary storage system ID 1E, and secondary volume ID 1F. The primary storage system ID 1C is a unique identifier of the storage system (primary storage system) 300 that provides a logical volume that becomes a copying source in the initial copying. The primary volume ID 1D is a unique identifier of a logical volume (primary volume) that becomes a copying source in the initial copying.

The secondary storage system ID 1E is a unique identifier of the storage system (secondary storage system) 300 that provides a logical volume that becomes a copying destination in the initial copying. The secondary volume 1F is a unique identifier of a logical volume (secondary volume) that becomes a copying destination in the initial copying.

Figure 17:
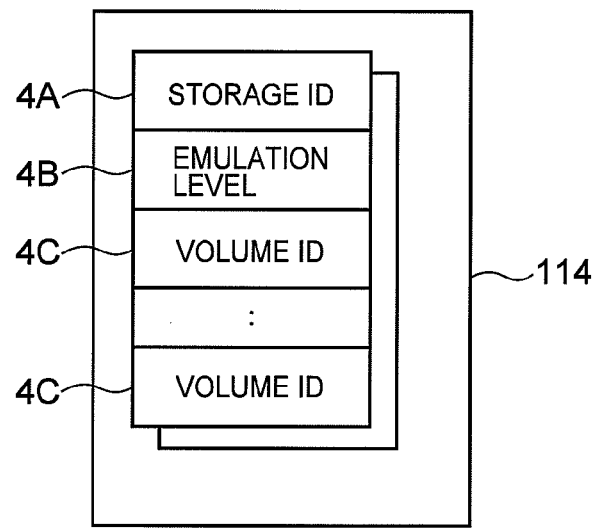
FIG. 17 is a configuration drawing of a storage system information table managed by the management computer in the embodiment of the present invention.

FIG. 17 is a configuration drawing of a storage system information table managed by the management computer in the embodiment of the present invention.

The storage information table 114 includes a storage ID 4A, an emulation level 4B, and at least one logical volume ID 4C. The storage ID 4A is a unique identifier of the storage system 300 that is managed by the management computer 100. The emulation level 4B is an emulation level held by the storage system 300. The logical volume ID 4C is a unique identifier of the logical volume provided by the storage system 300 identified by the storage ID 4A.

Figure 18:
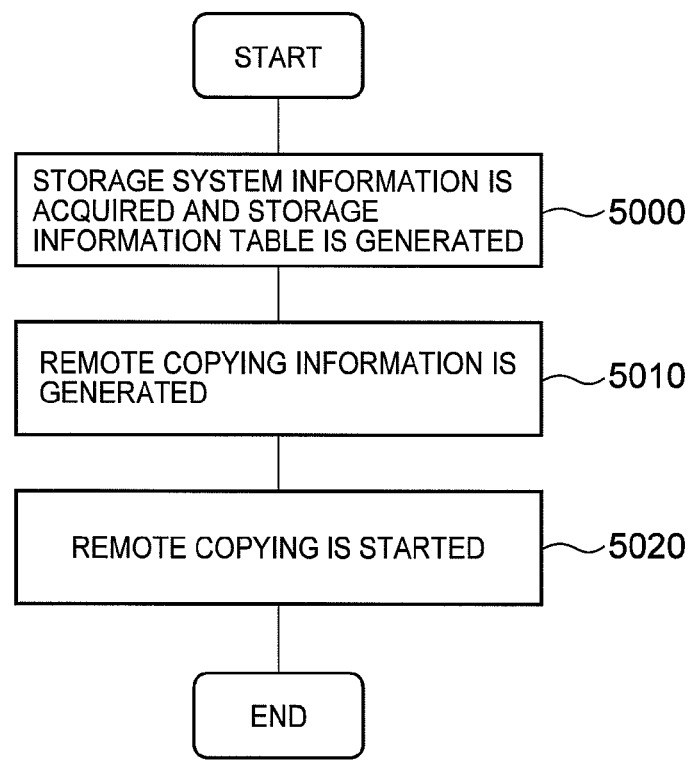
FIG. 18 is a flowchart of processing of the storage management program operated in the management computer of the embodiment of the present invention.

FIG. 18 is a flowchart of processing of the storage management program operated in the management computer of the embodiment of the present invention.

If the processor 120 executes the storage management program 112 in the management computer 100, the processor acquires the information of a plurality of storage systems 300 in order to manage a plurality of storage systems. For this purpose, the processor 120 of the management computer 100 issues an IO request 7300 containing a storage reference indication to a plurality of storage systems 300 (300a, 300b), acquires the information of each storage system 300 from the storage system 300, and generates the storage information table 114 based on the acquired information (step 5000). A unique identifier of the storage system 300, an emulation level, or identifier of the managed logical volume serve as the information acquired from the storage system 300. In the present embodiment, the storage system 300a can be operated as a plurality of logical storage systems in the storage system, but because the above-described processing illustrated by FIG. 19 is performed after providing the storage system 300b, the identifier of the representative logical storage system, that is, the identifier of the storage system 300a serves as a response to the storage reference indication of the management computer 100. Therefore, for the management computer 100 the identifier of the storage system 300a is stored in the storage information table 114.

The processor 120 of the management computer 100 then generates the configuration information necessary for the functions of each storage system. For example, in the case of remote copying, the copy information table 113 is generated (step 5010). The configuration information is generated according to the indication provided by the user making the settings from the input device (not shown in the figure) provided in the management computer 100 or the host computer via the device control link 550. For example, when the copy information table 113 is generated, the user making the settings can select the primary storage system ID, secondary storage system ID, primary volume ID, and secondary volume ID from the information located in the response to the storage reference indication to each storage system. As a result, when the representative logical storage system of the storage system 300a is selected, the identifier of the storage system 300a can be selected.

The control of functions of each storage system is then started using the configuration information generated in step 5010 (step 5020).

With the above-described storage system of the present embodiment, an identifier of one logical storage system is taken as an identifier of the storage system and communication with an external device is performed by using this identifier. Therefore, communication can be performed without obstacles even in the case of a device that cannot recognize the logical storage system. Therefore, for example, it is possible to link a storage system that can recognize the storage logical partitioning and a storage system that cannot recognize the storage logical partitioning.

Further, because an identifier of one logical storage system is disclosed as an identifier of the storage system from a plurality of storage system configuring the logical storage system of the management computer 100, the unimpeded operation can be conducted even with a management computer that does not correspond to the storage logical partitioning function.

The present invention was explained above based on one embodiment thereof, but the present invention is not limited to the above-described embodiment and can be also applied to a variety of other modes.

For example, in the above-described embodiment, an identifier of a logical storage system other than the representative logical storage system acquired prior to connection to the storage system 300b can be selected, for example, the setting such as remote copying between storage systems corresponding to the logical partitioning function may be performed, and the processing such as remote copying from the management computer 100 to the storage system 300a may be indicated. In this case, the indication of executable processing can be also received with the storage system 300a, and linked processing such as remote copying between storage systems corresponding to the indicated logical partitioning function can be executed.

Further, in the above-described embodiment, the disk drive 1500 was used as the volume of the storage system, but the present invention is not limited to such a configuration. For example, the entire disk drive or at least part thereof may be replaced with a storage medium such as flash memory, and essentially any device capable of recording data may be used.

What is claimed is:

1. A method for controlling a computer system that includes a host computer and a first storage system comprising a plurality of logical storage systems, each of the plurality of logical storage systems including at least one logical volume, a logical storage system identifier, at least one logical volume identifier of the at least one logical volume, and at least one enclosure logical volume identifier of the at least one logical volume, comprising the steps of:

providing a first logical storage system identifier to the computer, the computer recognizing the first logical storage system with the first logical storage system identifier;

providing a first logical volume and a first logical volume identifier of the first logical volume, wherein the first logical volume identifier is a unique identification in the first logical storage systems and is used to uniquely recognize the first logical volume in the first logical storage system by the host computer;

receiving a write request designating the first logical volume identified using the first logical volume identifier from the host computer;

acquiring a first enclosure logical volume identifier of the first logical volume on the basis of an association between the first logical volume identifier and the first enclosure logical volume identifier, the first enclosure logical volume identifier being a unique identification in the plurality of logical storage systems in the first storage system and being used to uniquely identify the first logical volume in the plurality of logical storage systems in the first storage system by the first storage system; and writing write data of the write request into the first logical volume identified by the first enclosure logical volume identifier.

2. The method for controlling a computer system according to claim 1, wherein the system further includes a second storage system managing a second volume as at least one logical volume, the method further comprising the steps of:

transmitting the write data to a second logical volume in the second storage system;

receiving the transmitted write data; and writing the write data into the second logical volume.

3. A method for controlling a computer system that includes a host computer and a first storage system comprising a plurality of logical storage systems each of the plurality of logical storage systems including at least one logical volume, a logical storage system identifier, at least one logical volume identifier of the at least one logical volume, and at least one enclosure logical volume identifier of the at least one logical volume, comprising the steps of:

providing a first logical storage system identifier to the computer, the computer recognizing the first logical storage system with the first logical storage system identifier;

providing a first logical volume and a first logical volume identifier of the first logical volume, wherein the first logical volume identifier is a unique identification in the first logical storage systems and is used to uniquely recognize the first logical volume in the first logical storage system by the host computer;

receiving a write request designating the first logical volume identified using the first logical volume identifier from the host computer;

acquiring a first enclosure logical volume identifier of the first logical volume on the basis of an association between the first logical volume identifier and the first enclosure logical volume identifier, the first enclosure logical volume identifier being a unique identification in the plurality of logical storage systems in the first storage system and being used to uniquely identify the first logical volume in the plurality of logical storage systems in the first storage system by the first storage system; and writing write data of the write request into the first logical volume identified by the first enclosure logical volume identifier.

4. The method for controlling a computer system according to claim 3, wherein the system further includes a second storage system managing a second volume as at least one logical volume, the method further comprising the steps of:

transmitting the write data to a second logical volume in the second storage system;

receiving the transmitted write data; and writing the write data into the second logical volume.

5. A method for controlling a storage system comprising a plurality of logical storage systems each of the plurality of logical storage systems including at least one logical volume, a logical storage system identifier, at least one logical volume identifier of the at least one logical volume, and at least one enclosure logical volume identifier of the at least one logical volume, comprising the steps of:

receiving a write request designating the first logical volume identified using the first logical volume identifier;

acquiring a first enclosure logical volume identifier of the first logical volume on the basis of an association between the first logical volume identifier and the first enclosure logical volume identifier, the first enclosure logical volume identifier being a unique identification in the plurality of logical storage systems in the storage system and being used to uniquely identify the first logical volume in the plurality of logical storage systems in the first storage system by the first storage system; and writing write data of the write request into the first logical volume identified by the first enclosure logical volume identifier.

* * * * *